UNITED STATES PATENT OFFICE 2,529,917

PROCESS FOR PREPARING ALKYL ISODEHYDROACETATES

Harry W. Coover, James E. Guillet, and Joseph B. Dickey, Rochester, N. Y., assignors to Eastman Kodak Company, Rochester, N. Y., a corporation of New Jersey No Drawing. Application September 24, 1949, Serial No. 117,716

17 Claims. (Cl. 260—344)

This invention relates to an improved process for preparing alkyl isodehydroacetates.

It is known that alkyl isodehydroacetates may be prepared by condensing alkyl acetoacetates in the presence of an acidic condensing agent at room temperature or lower temperatures and under ordinary atmospheric pressure. Thus, it is known that ethyl isodehydroacetate may be prepared by introducing anhydrous hydrogen chloride into cold ethyl acetoacetate (at temperatures near 0° C.) and allowing the mixture to stand for a long period of time (of the order of 2 weeks) at room temperatures with usually an additional cooling to near 0° C., accompanied by the introduction of more hydrogen chloride. However, the yields obtained by such known processes rarely exceeded 50 per cent until at least two weeks had elapsed. It is also known that similar results may be obtained when concentrated sulfuric acid is employed as the condensing agent, the other conditions being substantially the same as described for the utilization of hydrogen chloride.

The extensive periods of time for accomplishing the condensation reaction under such conditions were necessary in order to obtain worthwhile yields. The employment of temperatures no higher than room temperature was necessary in order to avoid the occurrence of side reactions such as lactone formation, hydrolysis, etc. During the preparation of alkyl isodehydroacetates the formation of water during the condensation reaction, accompanied by the presence of the acidic condensation agent, together create a normally conducive condition for the promotion of hydrolysis. Higher temperatures also are ordinarily expected to stimulate hydrolysis.

Under the conditions known in the prior art, ethyl isodehydroacetate has been prepared by condensing a solution of six equivalents (3 mols) of concentrated sulfuric acid per mol of ethyl acetoacetate at room temperature (about 25° C.) for 10 to 14 days with a consequent 82 per cent yield of an approximately half-and-half mixture of ethyl isodehydroacetate and isodehydroacetic acid. Since the free acid is not a desired product of our process, such a yield of only 41 per cent ester is not very satisfactory. The free acid is difficult to esterify, and its formation is therefore not desired.

Upon further investigation into the use of sulfuric acid as the condensing agent, we found that the side reactions involved at increased temperatures and various concentrations resulted in so many undesirable by-products that satisfactory yields of alkyl isodehydroacetates were not obtainable even though increased rates of reaction did accompany the increase in the temperatures.

It was also found that when the temperature of the condensation was raised, the over-all yield of ethyl isodehydroacetate and isodehydroacetic acid was lowered. Further, it was found that the proportion of this yield which was ester also diminished as the temperature was increased. Thus, by way of example, if three equivalents of concentrated sulfuric acid per mol of ethyl acetoacetate are admixed and permitted to undergo condensation for 16 hours, the following results obtain:

| Temp., °C. | Yield of Ester, Per Cent | Yield of Acid, Per Cent | Combined Yield of Ester and Acid, Per Cent | Proportion of Combined Yield which is Acid, Per Cent |
|---|---|---|---|---|
| 25 | 42.2 | 14.8 | 57 | 26 |
| 45 | 38.2 | 14.8 | 53 | 28 |
| 60 | 32.9 | 14.1 | 47 | 30 |

The balance of the product resulting from the reaction consisted principally of a side reaction product called mesitene lactone which is essentially decarboxylated isodehydroacetic acid. It is apparent from the above data that increasing the temperature of the reacting mixture is not a satisfactory way of increasing the rate of production of an alkyl isodehydroacetate when using sulfuric acid as the condensing agent.

However, we have now found that when a high concentration of anhydrous hydrogen chloride is employed as the condensing agent, excellent yields of alkyl isodehydroacetates can be prepared by the condensation of alkyl acetoacetates in small fractions of the time required by the formerly known processes. We have further found that by increasing the temperature of the reaction mixture, increased rates of reaction result without deleterious side reactions substantially reducing the desired yields of ester.

The principal reaction can be represented as follows:

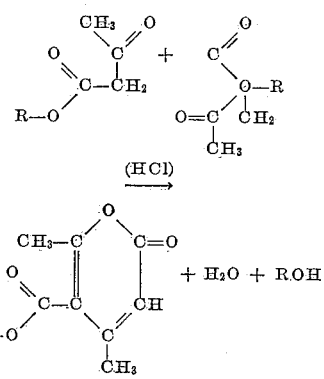

wherein R represents an alkyl radical.

It is accordingly an object of our invention to provide an improved process for preparing alkyl isodehydroacetates. This objective includes the obtaining of considerably larger yields in much shorter periods of time than those previously known. Other objects will become apparent hereinafter.

In accordance with our invention, an alkyl acetoacetate is condensed in a closed vessel at a temperature of from about 25° C. to about 100° C. in the presence of an initial concentration of from 1.2 to 4 mols of substantially anhydrous hydrogen chloride per mol of the alkyl acetoacetate.

The hydrogen chloride is combined with the alkyl acetoacetate in a pressure-type reaction vessel; e. g., a stainless steel autoclave. The desired quantity of alkyl acetoacetate can be placed in the vessel and hydrogen chloride introduced into the vessel under sufficient pressure such that the desired concentration of hydrogen chloride is obtained in solution in the alkyl acetoacetate. Upon this concentration being obtained, the vessel is closed and the reaction begun. Hereinafter when the term "concentration" is employed, it is to be understood to mean the number of mols of hydrogen chloride dissolved in each mol of alkyl acetoacetate at the commencement of the condensation reaction.

For example, if a concentration of approximately 1.4 is desired, then at a temperature of about 50° C. a pressure of about 150 pounds per square inch of anhydrous hydrogen chloride is required.

However, we advantageously obtain a given concentration very conveniently by weighing the appropriate amount of alkyl acetoacetate into a pressure-type vessel whose tare weight is known, computing the necessary weight of hydrogen chloride to obtain the given concentration, introducing hydrogen chloride into the closed vessel until the gross weight includes the computed weight of the necessary quantity of hydrogen chloride, and then sealing the vessel to thereby maintain a constant concentration regardless of temperature and corresponding pressure changes. By this method the pressure of the hydrogen chloride in the closed vessel is incidental to the concentration and need not necessarily be measured or known. Since the pressure is obviously less at low temperatures, it is most advantageous to introduce the hydrogen chloride into the alkyl acetoacetate prior to the application of any heat.

Initial concentrations of from 1.2 up to about 4 can be employed to obtain excellent yields in relatively short periods of time. Advantageously we employ an initial concentration of from 1.4 to 2.5 mols of hydrogen chloride per mol of alkyl acetoacetate.

Temperatures of from about 25° C. to about 100° C. can be employed in practicing our invention. Advantageously we employ a temperature of from 25° C. to 75° C.

The alkyl acetoacetates which can be advantageously employed include methyl, ethyl, and n-propyl acetoacetates. However, any of the lower alkyl esters can be employed. Thus, we can employ any of the alkyl acetoacetates, especially those containing from 1 to 6 carbon atoms in the alkyl radical, thereby producing the corresponding alkyl isodehydroacetates.

As illustrative of the variations of which our invention is susceptible, the following data are tabulated for ease of consideration. These data relate to the condensation reaction of ethyl acetoacetate except for those asterisked and footnoted.

| Temp., °C. | Concentration, Mols HCl/Mol Ester | Reaction Period, Hrs. | Yield, Per Cent |
|---|---|---|---|
| 25 | 1.2 | 45 | 63 |
| 25 | 1.4 | 45 | 69 |
| [1] 25 | [1] 1.4 | [1] 45 | [1] 69 |
| 25 | 3.5 | 45 | 71 |
| [2] 25 | [2] 3.5 | [2] 45 | [2] 70 |
| 48 | 1.5 | 16 | 68 |
| 48 | 4.0 | 16 | 64 |
| 60 | 1.5 | 6 | 63 |
| 60 | 2.1 | 3.3 | 78 |
| 60 | 2.9 | 5 | 58 |

[1] Data for methyl acetoacetate→methyl isodehydroacetate.
[2] Data for n-propyl acetoacetate→n-propyl isodehydroacetate.

The following examples will serve to illustrate further the manner of practicing our invention, the first example being included in order to clearly demonstrate the improvement in our invention over the previously known procedure.

*Example 1*

130 g. of ethyl acetoacetate was placed in a 300 ml. three-necked flask and was cooled in an ice-salt bath to about 0° C. while dry HCl was bubbled in with stirring for 7 hours. The reaction mixture was allowed to stand at room temperature (approx. 25° C.) for one week and was then subjected to the same treatment again, except that HCl was bubbled in for 5 hours. A second week was allowed to pass. The reaction mixture was then poured into 30 ml. of ice and water and extracted three times with ether-chloroform (2:1 mixture). The extracted solutions were dried and distilled. After a small forerun, 50 g. of ethyl isodehydroacetate was obtained. This product boiled at 118° to 125° C. at 2 mm. of Hg pressure and represented a yield of 51 per cent.

*Example 2*

50 g. ethyl acetoacetate was weighed into a pressure-type vessel whose tare was known, and 20 g. of anhydrous HCl gas was dissolved under pressure (concentration of 1.4 mol per mol of ethyl acetoacetate). The vessel was sealed and allowed to stand for 45 hours at room temperature (approx. 25° C.). Upon fractionation of this reaction mixture, a yield of 26.0 g. of ethyl isodehydroacetate was obtained which represented a yield of 69 per cent.

*Example 3*

The process of Example 2 was repeated exactly, except that methyl acetoacetate was used and methyl isodehydroacetate was obtained in molecularly equivalent quantities to those set forth in Example 2. A yield of 69 per cent was obtained.

*Example 4*

50 g. of ethyl acetoacetate was weighed into a pressure-type reaction vessel, and 21 g. of dry HCl was dissolved under pressure (concentration of 1.5 mol per mol of ethyl acetoacetate). The vessel was sealed and the reaction mixture was warmed to 48° C. and maintained at that temperature for a period of 16 hours. The product obtained was fractionated and a 68 per cent yield of ethyl isodehydroacetate was obtained.

Example 5

The process of Example 4 was repeated exactly, except that a temperature of 60° C. was employed for only 6 hours' duration. The yield obtained was 63 per cent.

In a manner similar to that set forth in the above examples, other alkyl isodehydroacetates can be obtained by substituting the appropriate alkyl acetoacetate and submitting it to corresponding conditions. The concentrations and temperatures can be varied within the scope of the ranges set forth. Thus, n-propyl acetoacetate in the presence of an initial concentration of 3.5 mols of hydrogen chloride per mol of n-propyl acetoacetate will condense at a temperature of 25° C. over a period of 45 hours to give a 70 per cent yield of n-propyl isodehydroacetate.

Accordingly, it is apparent that our new process provides a means for obtaining yields of 60 to 75 per cent and more of alkyl isodehydroacetates in periods of time as short as just a few hours.

What we claim as our invention and desire to secure by Letters Patent of the United States is:

1. A process for preparing an alkyl isodehydroacetate comprising condensing, in a closed vessel, an alkyl acetoacetate containing from 1 to 6 carbon atoms in the alkyl group at a temperature of from 25° to 100° C. in the presence of an initial concentration of from 1.2 to 4 mols of hydrogen chloride per mol of alkyl acetoacetate.

2. A process as defined in claim 1 wherein the temperature range is from 25° C. to 75° C.

3. A process as defined in claim 2 wherein the concentration range is from 1.4 to 2.5.

4. A process as defined in claim 1 wherein the concentration range is from 1.4 to 2.5.

5. A process for preparing methyl isodehydroacetate comprising condensing, in a closed vessl, methyl acetoacetate at a temperature of from 25° C. to 100° C. in the presence of an initial concentration of from 1.2 to 4 mols of hydrogen chloride per mol of methyl acetoacetate.

6. A process as defined in claim 5 wherein the temperature range is from 25° C. to 75° C.

7. A process as defined in claim 6 wherein the concentration range is from 1.4 to 2.5.

8. A process as defined in claim 5 wherein the concentration range is from 1.4 to 2.5.

9. A process for preparing ethyl isodehydroacetate comprising condensing, in a closed vessel, ethyl acetoacetate at a temperature of from 25° C. to 100° C. in the presence of an initial concentration of from 1.2 to 4 mols of hydrogen chloride per mol of ethyl acetoacetate.

10. A process as defined in claim 9 wherein the temperature range is from 25° C. to 75° C.

11. A process as defined in claim 10 wherein the concentration range is from 1.4 to 2.5.

12. A process as defined in claim 9 wherein the concentration range is from 1.4 to 2.5.

13. A process as defined in claim 9 wherein the temperature is about 60° C. and the concentration is about 2.1.

14. A process for preparing n-propyl isodehydroacetate comprising condensing, in a closed vessel, n-propyl acetoacetate at a temperature of from 25° C. to 100° C. in the presence of an initial concentration of from 1.2 to 4 mols of hydrogen chloride per mol of n-propyl acetoacetate.

15. A process as defined in claim 14 wherein the temperature range is from 25° to 75° C.

16. A process as defined in claim 15 wherein the concentration range is from 1.4 to 2.5.

17. A process as defined in claim 14 wherein the concentration range is from 1.4 to 2.5.

HARRY W. COOVER.
JAMES E. GUILLET.
JOSEPH B. DICKEY.

No references cited.

Certificate of Correction

Patent No. 2,529,917                                              November 14, 1950

HARRY W. COOVER ET AL.

It is hereby certified that error appears in the printed specification of the above numbered patent requiring correction as follows:

Column 2, lines 42 to 48, inclusive, for the right-hand portion of the formula reading

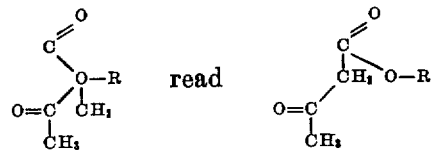

column 4, line 48, after "tare" insert the word *weight*; column 5, line 40, for "vessl" read *vessel*;

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*